US010846834B2

(12) United States Patent
Fleizach

(10) Patent No.: US 10,846,834 B2
(45) Date of Patent: Nov. 24, 2020

(54) SHADOW BRIGHTENING IMAGE ENHANCEMENT

(71) Applicant: SPAWAR Systems Center Pacific, San Diego, CA (US)

(72) Inventor: Gregory K. Fleizach, San Diego, CA (US)

(73) Assignee: United States of America as Represented by the Secretary of the Navy, Washington, DC (US)

( * ) Notice: Subject to any disclaimer, the term of this patent is extended or adjusted under 35 U.S.C. 154(b) by 92 days.

(21) Appl. No.: 16/280,901

(22) Filed: Feb. 20, 2019

(65) Prior Publication Data
US 2020/0265563 A1 Aug. 20, 2020

(51) Int. Cl.
G06T 5/00 (2006.01)
G06T 5/40 (2006.01)
G06T 3/40 (2006.01)

(52) U.S. Cl.
CPC ............ *G06T 5/009* (2013.01); *G06T 3/4084* (2013.01); *G06T 5/40* (2013.01); *G06T 2207/10024* (2013.01)

(58) Field of Classification Search
CPC .......... G06T 5/009; G06T 3/4084; G06T 5/40
USPC ....................................................... 382/274
See application file for complete search history.

(56) References Cited

U.S. PATENT DOCUMENTS

| | | | |
|---|---|---|---|
| 6,320,578 B1 | 11/2001 | Shiitani | |
| 8,311,360 B2 | 11/2012 | Rai | |
| 8,538,145 B2 | 9/2013 | Finlayson | |
| 8,761,497 B2 | 6/2014 | Berkovich | |
| 8,866,938 B2 | 10/2014 | Haas | |
| 8,872,947 B2 | 10/2014 | Haas | |
| 9,392,993 B2 | 7/2016 | Wang | |
| 9,843,761 B2 | 12/2017 | Thompson | |
| 10,003,765 B2 | 6/2018 | Thompson | |
| 10,026,004 B2 | 7/2018 | Mizes | |
| 2010/0278448 A1* | 11/2010 | Friedhoff | G06T 5/007 382/274 |
| 2019/0102935 A1* | 4/2019 | Neulander | G06T 17/20 |

\* cited by examiner

*Primary Examiner* — Ayodeji O Ayotunde
(74) *Attorney, Agent, or Firm* — Naval Information Warfare Center, Pacific; Kyle Eppele; James McGee

(57) ABSTRACT

A shadow brightening method includes receiving, at a memory device, an original input image, a brightening level, and a threshold pixel intensity. If a pixel intensity is greater than the threshold, then the pixel is considered bright. Otherwise, the pixel is shadowed. The method includes calculating a gamma transformation for each pixel. If the pixel intensity is less than or equal to the threshold, then a gamma transformation equal to the received brightening level is applied. If the pixel intensity is greater than the threshold, then the gamma transformation is scaled to decrease with intensity. For each shadowed pixel, the method includes computing a minimum value. It also includes determining the brightening level to be applied, thus creating a gamma map. The method also includes applying the determined brightening level to the shadowed pixels and outputting a shadow-brightened output image.

20 Claims, 8 Drawing Sheets

Comparison of Gamma Correction and Shadows Enhancement: Original

Comparison of Gamma Correction and Shadows Enhancement: Gamma-Corrected

Comparison of Gamma Correction and Shadows Enhancement: Shadows Enhanced

SHADOW BRIGHTENING IMAGE ENHANCEMENT

STATEMENT OF GOVERNMENT INTEREST

Federally-Sponsored Research and Development

The United States Government has ownership rights in this invention. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil. Reference Navy Case No. 103706.

BACKGROUND OF THE INVENTION

Field of Invention

This disclosure relates to image processing, and more particularly, to shadow brightening in images.

Description of Related Art

Shadowed regions are common in backlit imagery where the light source is behind the subject. The standard brightening approach is to use a gamma (power-law) transformation. The pixel intensity is raised to a power (gamma) where gamma is less than intensity. This transformation maps a narrow range of dark input values to a wider range of output levels, with the opposite true for higher values of input levels. The opposite is true for gamma values that are greater than one.

The gamma transformation operates over the entire image. That is, the dark regions get brighter and the bright regions get brighter. This can often lead to "blooming" in the brightened image and a washed out result in general.

Another previous method that results in brightening of the image is to use histogram equalization. While not a brightening technique per se, histogram equalization has the effect of spreading the pixel intensities over the entire range. For a very dark image, this means that some areas become brighter, while the darkest stay dark. The result of histogram equalization can be very harsh, especially for a dark image where a relatively small number of levels get spread over the entire range. Contouring is a common objectionable artifact from histogram equalization.

For some applications, shading correction by imaging a target of constant intensity may be used to correct the brightness. In a controlled setting like a manufacturing plant, for example, a reference image can be used to correct the brightness and illumination differences in other images. The reference image could be obtained prior to the start of imaging using a constant intensity target. The reference image may show the illumination function that can be used to correct the rest of the images. This approach can work well, but this approach is obviously not applicable to most situations. A related approach is to use skin-colored pixels as a reference for brightness adjustment. However, this is only valid when the subject is human and of expected skin tone.

Other previous methods sometimes employed are top-hat/bottom-hat corrections for light objects on a dark background and dark objects on a light background, respectively. These techniques work well for certain types of images (e.g. inspection), but have limited usefulness for natural scenes. Local thresholding using moving averages can be used to account for illumination differences, but does not enhance the image for the viewer.

A method to deconstruct an image into illumination and reflectance components called homomorphic processing has been used with success in certain conditions, but it does not work well against a variety of images. This is sometimes referred to as separating the image into low and high frequency luminance components. Tone mapping approaches have also been explored, but similar to gamma transformations, these have been applied to the whole image, causing the same drawbacks. More complicated techniques such as genetic algorithms have been proposed as well, but these are very complex and computationally expensive.

There is a need for a shadow brightening system and method that reduce the chances of blooming or washed out portions, that does not result in contouring artifacts, and that works with non-humans and/or unexpected skin tones. There is further a need for a shadow brightening system and method that are useful for natural scenes.

BRIEF SUMMARY OF INVENTION

The present disclosure provides a shadow brightening method and system. In accordance with one embodiment of the present disclosure, a method for shadow brightening is provided.

The method comprises receiving, at a memory device, an original input image, a brightening level, and a threshold pixel intensity, wherein if a pixel intensity in the original input image is greater than the threshold pixel intensity, then the pixel intensity is a bright pixel, and wherein if a pixel intensity for a pixel in the original input image is less than or equal to the threshold pixel intensity, then the pixel is a shadowed pixel.

The method further includes calculating, via a processor, a gamma transformation for each said pixel, wherein if the pixel intensity is less than or equal to the threshold pixel intensity, then a gamma transformation value equal to the received brightening level is applied. If the pixel intensity is greater than a threshold pixel intensity, then a gamma transformation value that is scaled is applied such that the gamma value decreases with intensity.

Then, for each said shadowed pixel, the method includes computing, via the processor, the minimum of the calculated gamma transformation value and the number one for each said shadowed pixel. The method also includes determining, via the processor, the brightening level to be applied, thus creating a gamma map that indicates brightening levels to be applied to the original input image.

The method also includes applying, via the processor, the determined brightening level to the shadowed pixels; and outputting, via the processor, a shadow-brightened output image.

These, as well as other objects, features and benefits will now become clear from a review of the following detailed description, the illustrative embodiments, and the accompanying drawings.

BRIEF DESCRIPTION OF DRAWINGS

The accompanying drawings, which are incorporated in and form a part of the specification, illustrate example embodiments and, together with the description, serve to explain the principles of the method and system for shadow brightening. In the drawings.

DETAILED DESCRIPTION OF THE INVENTION

The present system and method for shadow brightening involves enhancing overly dark images by brightening the shadowed portions of an image.

The present system and method are used to brighten the dark, or shadowed, regions of an image while leaving the bright regions of the image intact. This avoids the common problems caused by a standard gamma transformation, such as a washed-out result or blooming of the bright regions. Instead of a single gamma value being applied to every pixel in the original input image, the present system and method let the user divide the image into two regions: shadowed and bright regions. Thereafter, the shadowed and bright regions may be handled separately so that the bright regions are not further brightened, but the shadowed regions are enhanced.

Figure 1:
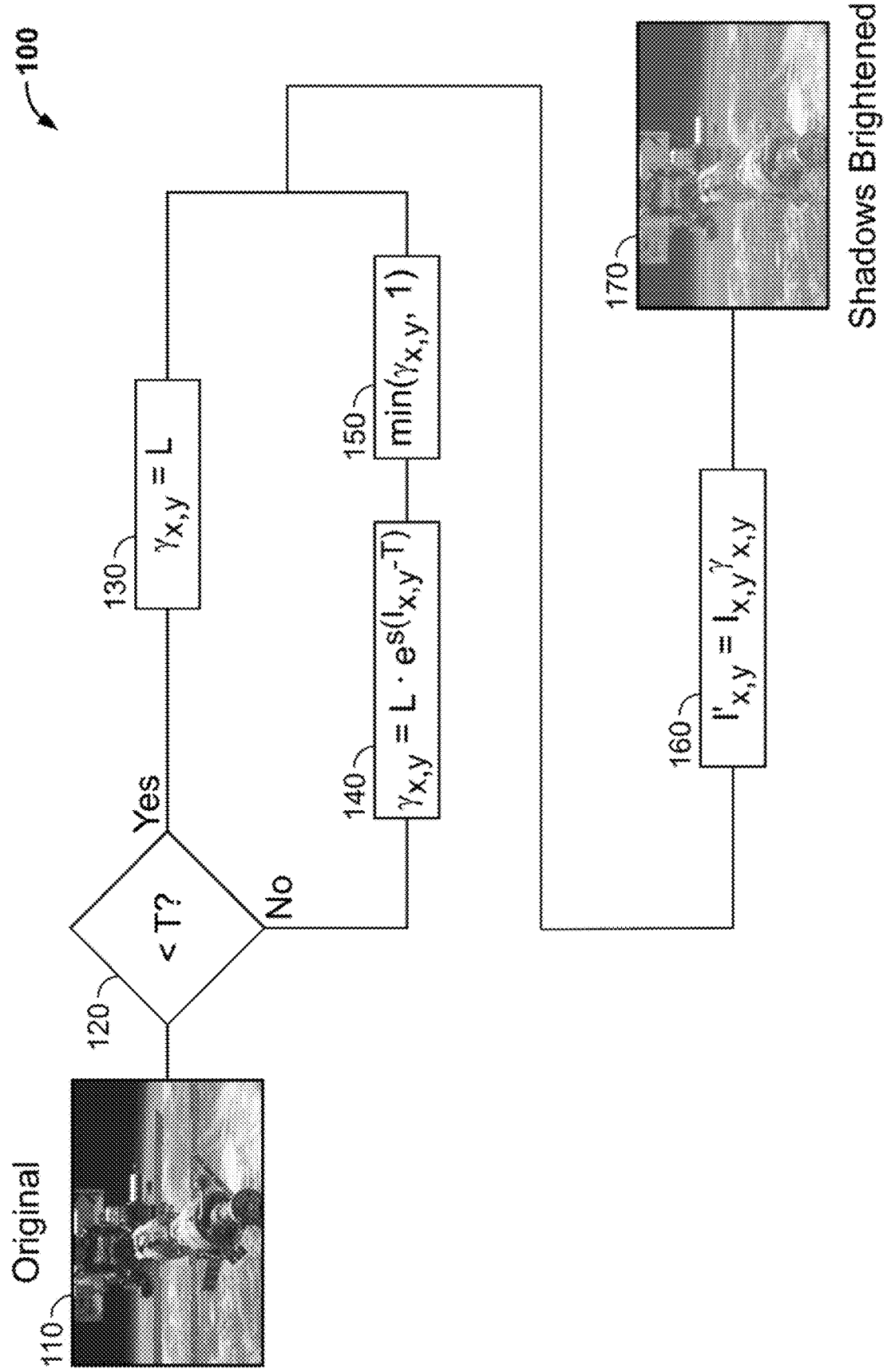
FIG. 1 is a block diagram of a method for shadow brightening in accordance with one embodiment of the present disclosure.

Referring now to FIG. 1, illustrated is a block diagram of a method for shadow brightening in accordance with one embodiment of the present disclosure. At step 110, an original input image is provided. This image will have its shadows brightened, if needed. The image may be a still image, or an image from a video or any other image type. It may also be monochrome or color. Along with receiving the original input image, or prior thereto, or even thereafter, the system may also receive a brightening level to be applied. The brightening level may be input by the user or predetermined via the shadow brightening method.

At step 120, the method includes receiving input of a threshold pixel intensity, thus allowing the user to set the threshold level (T) for pixel intensities. Pixel intensities below or equal to the threshold are treated as shadowed pixels, and pixel intensities above the threshold are treated as bright pixels.

This value assigned for the threshold pixel intensity will depend on the specific images, but can vary in the range from [0,1] where zero (0) means that all the pixels are above the threshold (all bright) and one (1) means that no pixels are above the threshold (all dark). The image pixels are handled differently depending on whether a pixel is considered to be in the dark/shadowed region or the bright region. If the pixel is in the dark/shadowed region, then at step 130, the gamma (γ) value for the power-law transformation is just the user input value, L. This value L determines the level of brightening to be applied and is in the range of [0,1]. The lower the value of L, the more brightening is applied. At zero (0), all the pixels become white and at one (1), no change is applied to the pixels.

If the image pixel intensity value is greater than the threshold T, then at step 140, the gamma value used in the power-law transformation is calculated differently than at step 130. In this case, at step 140, the gamma value is a function that decreases with intensity, e.g., in accordance with the following equation:

$$\gamma_{x,y} = L * e^{S(I_{x,y} - T)} \qquad \text{(Equation 1)}$$

Specifically, the further the pixel intensity is from the threshold, the less brightening is applied. If the pixel intensity is above, but near the threshold, the term in the exponent $S(I_{x,y}-T)$ evaluates to approximately zero (0), so the gamma value is nearly L. As the pixel intensities get farther and farther from the threshold, the term in the exponent increases, which increases gamma. A larger gamma means less brightening. The value of the scale factor S changes the rate at which the exponent increases.

Figure 2:
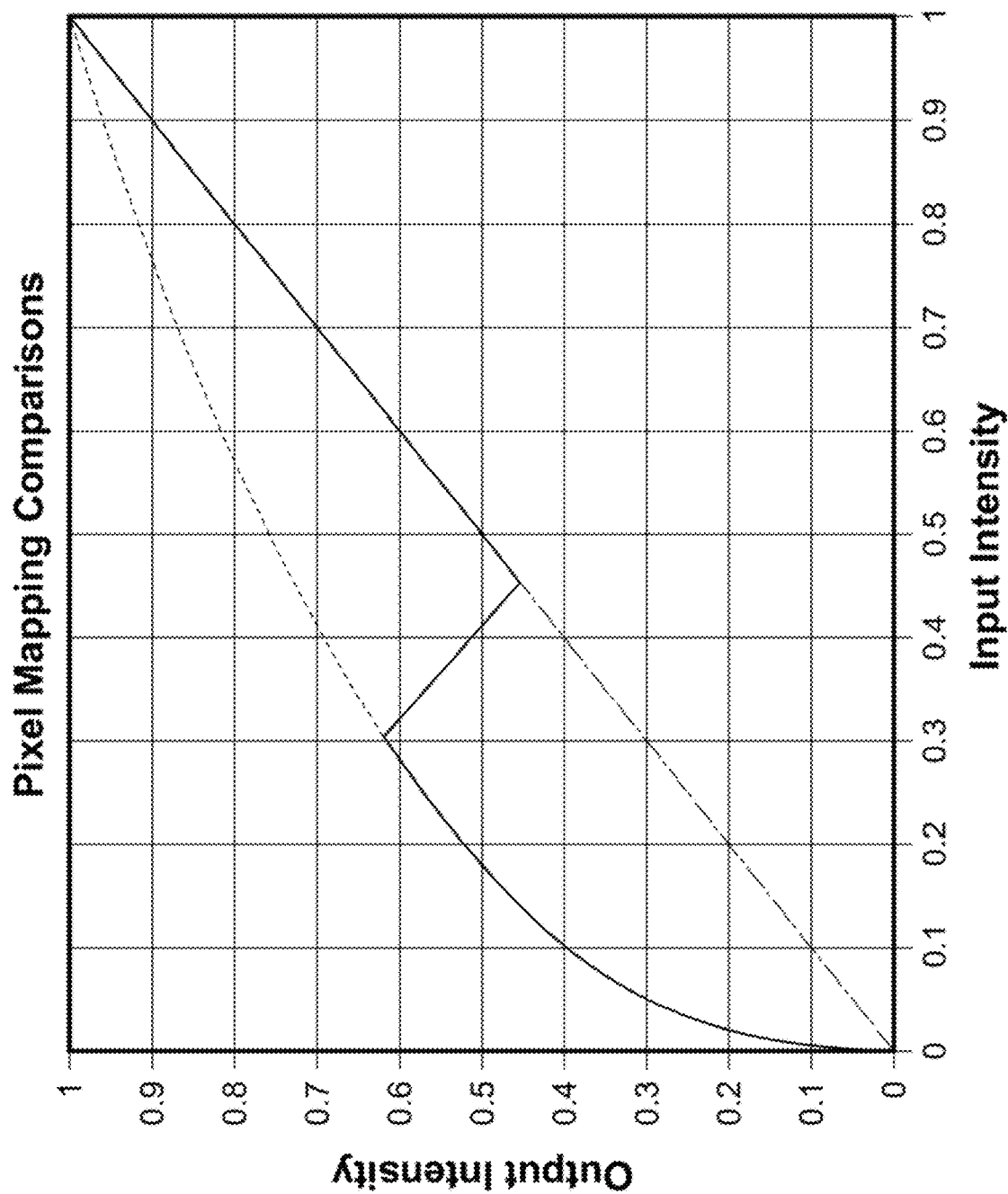
FIG. 2 is a graph showing output intensity versus input intensity in a pixel map for shadow enhancement in accordance with one embodiment of the present disclosure.

Referring now to FIG. 2, illustrated is an example of pixel mapping for shadow enhancement in accordance with one embodiment of the present disclosure. The identity transformation is the straight line where input equals output. The standard gamma function as shown in the dotted line where it can be seen that even high input values map to even higher output values (e.g. output=0.92 for input=0.8). The pixel mapping for the shadow enhancement is shown by the solid black line. The same value was used for gamma and L (0.4 for this example). In this example, a threshold of 0.3 was chosen for the shadows enhancement and it can be seen from FIG. 2 that this is where the shadow enhanced pixel mapping diverges from the prior art gamma pixel mapping. There is a transition region between the shadowed and bright areas of image from 0.3 to 0.45. The larger the value of the scale factor, the smaller this transition region (that is, the shadows pixel mapping curve diverges from the gamma curve faster). Conversely, the lower the scale factor, the wider the transition region (slower it diverges from gamma curve and the more it resembles the gamma curve). For the shadow enhancement, for input=0.8, the output=0.8 in this example.

The scale factor has the effect of changing how abrupt the transition from shadowed to bright regions is. A higher value of S means a more abrupt transition and a lower value means a less abrupt transition. If S is lowered enough, the transition ceases to exist and the whole image is treated as the shadowed region. Referring back to FIG. 1, after the gamma value is calculated for each pixel in the bright region, at step 150, the minimum of the calculated gamma and one (1) is computed. That is, if any gamma value is greater than one (1), the gamma value is reduced to one (1). This is necessary because otherwise, gamma values over one (1) could occur, which have the effect of darkening the bright pixels. The result would end up looking like an image with the intensities inverted. Instead, by limiting the gamma values to one (1), if a pixel has a gamma value of one (1) then that pixel will be unchanged.

After a gamma value is calculated for each pixel in the image, thus creating a gamma map, then at step 160, the gamma value is applied to each pixel in the standard power-law transformation. Since the gamma values in the bright region are a function of intensity, but the gamma values in the shadowed region are constant, the shadowed areas are brightened, but the bright values are primarily left untouched (except in the transition region). For these pixels, the gamma value was greater than or equal to one and was reduced to one (1). Raising the pixel intensity to the power of 1 has no effect.

Figure 3A:
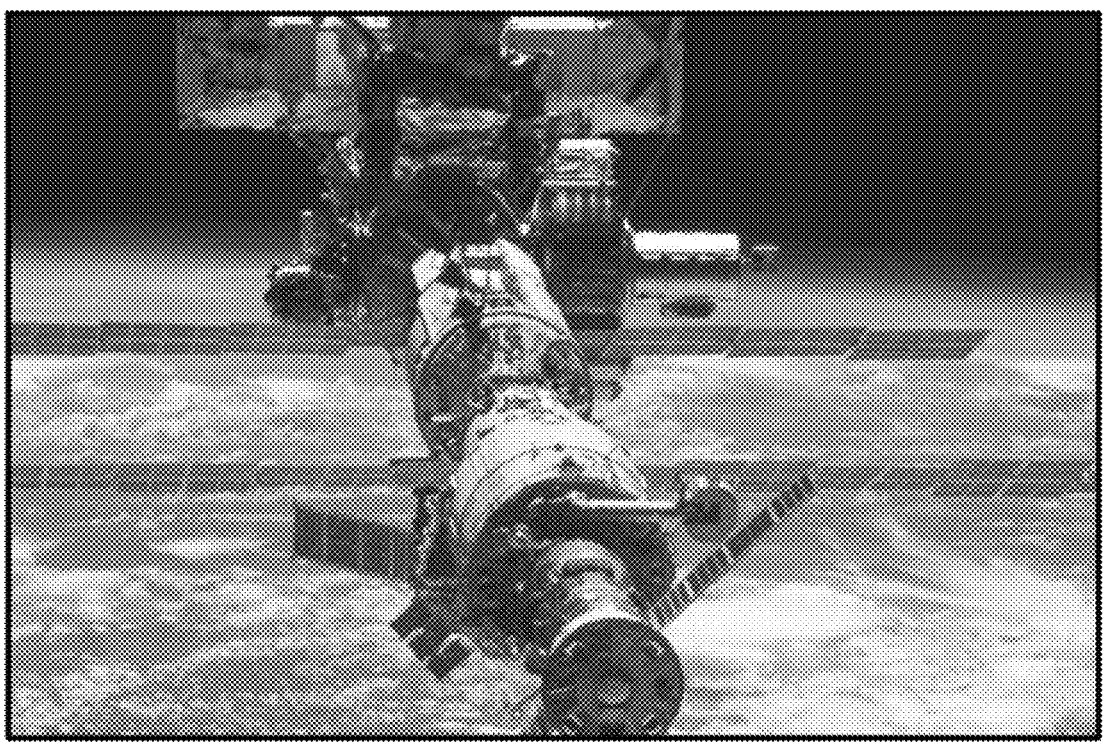
FIG. 3A shows the original input image in contrast to the shadow enhanced image of FIG. 3B in accordance with one embodiment of the present disclosure.
Figure 3B:
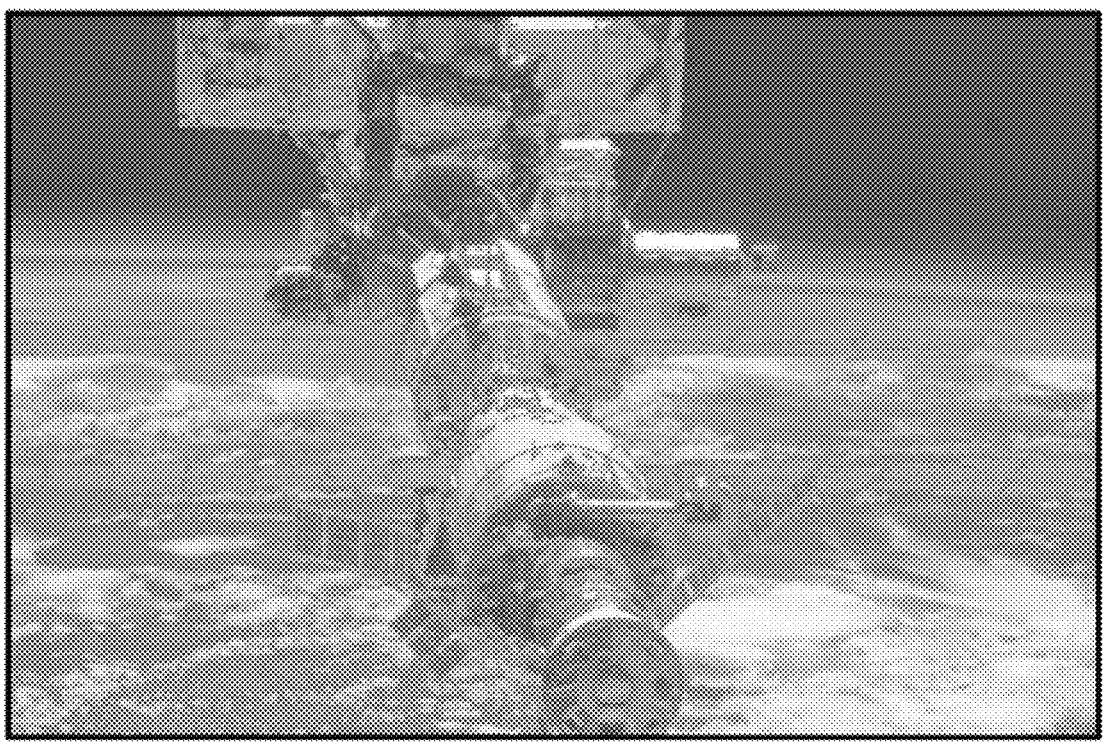

At step 170, the shadow brightened image is output. Referring now to FIG. 3A, illustrated is the original input image in contrast to the shadow enhanced image of FIG. 3B in accordance with one embodiment of the present disclosure. Shown is the Earth and the International Space Station (ISS). Note that the intensity of the Earth is largely unchanged, but now the details of the ISS are much more evident. For example, in the top and bottom of the image, the details on the ISS are much easier to see. Additionally, we can now see the atmosphere of the Earth on the horizon.

Figure 4:
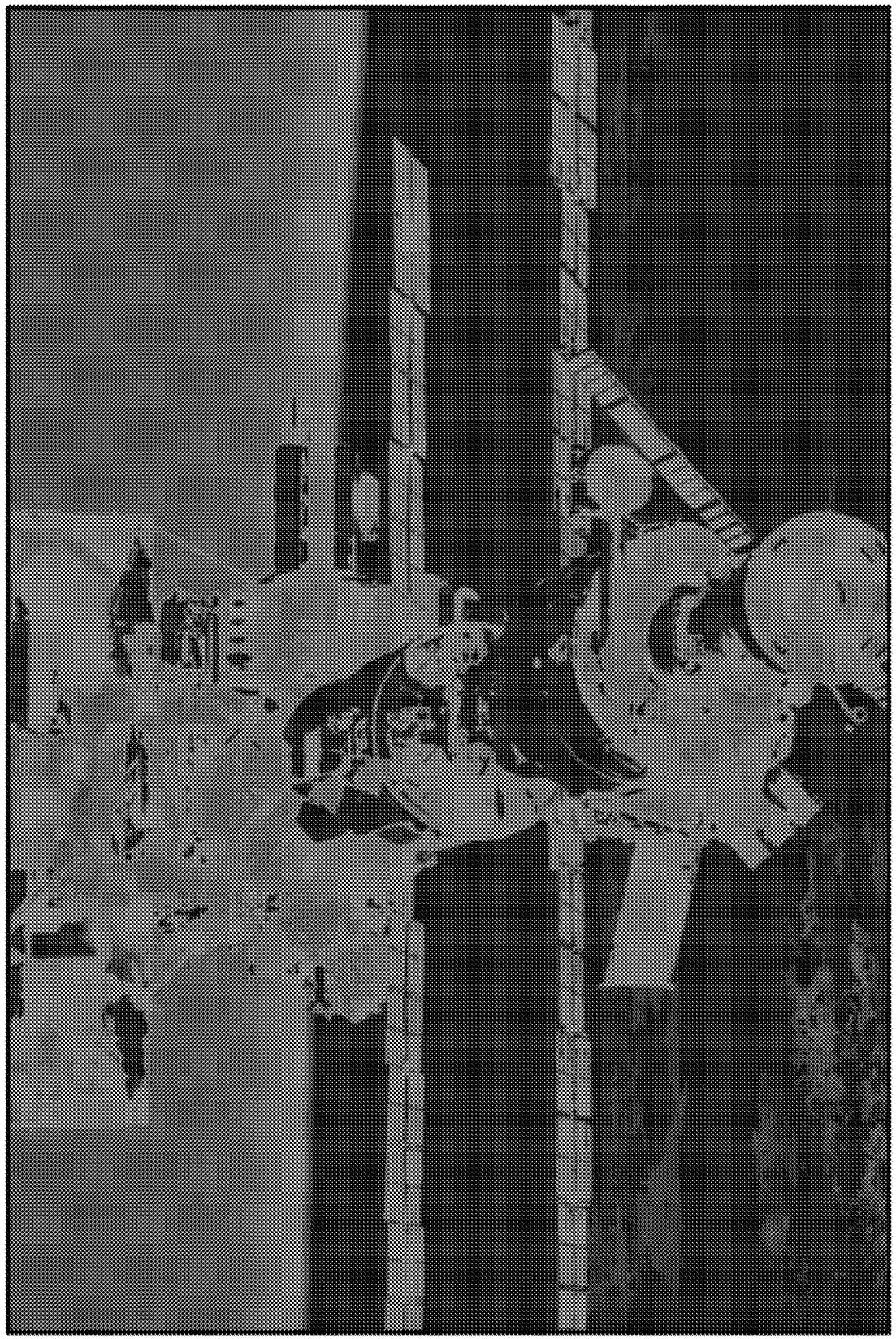
FIG. 4 is an illustration of a magnitude of differences between enhanced shadows and the original input image in accordance with an embodiment of the present disclosure.

It is clear that only the dark portions of the image were changed when looking at the magnitude of the differences between the shadow enhanced image and the original images. This is evident in FIG. 4 which is an illustration of a magnitude of differences between enhanced shadows and the original input image in accordance with an embodiment of the present disclosure. Note that the Earth area is all black since this portion of the image has not changed at all, nor have the brightest portions of the ISS. FIG. 4 highlights where the details in the shadows have been enhanced. A gamma map (not shown), as known in the art, may indicate brightening levels to be applied to the original input image. For example, pixels given a value of 1 (white) are changed pixels, and 0 (black) for unchanged pixels.

The advantages of the present method over the old methods are that it brightens the dark, or shadowed, regions of an image while leaving the bright regions of the image intact as shown in FIGS. 3 and 4. This avoids the common problems caused by other methods (e.g. standard gamma transformation) of a washed out result or blooming of the bright regions.

Instead of the blooming that can be caused by typical brightening schemes, the present system and method avoid blooming with the independent adjustment of the threshold level to define the shadows (T), a level of brightening (L), and a scale factor (S) to determine the sharpness of the transition between the shadowed and bright areas.

Figure 5A:
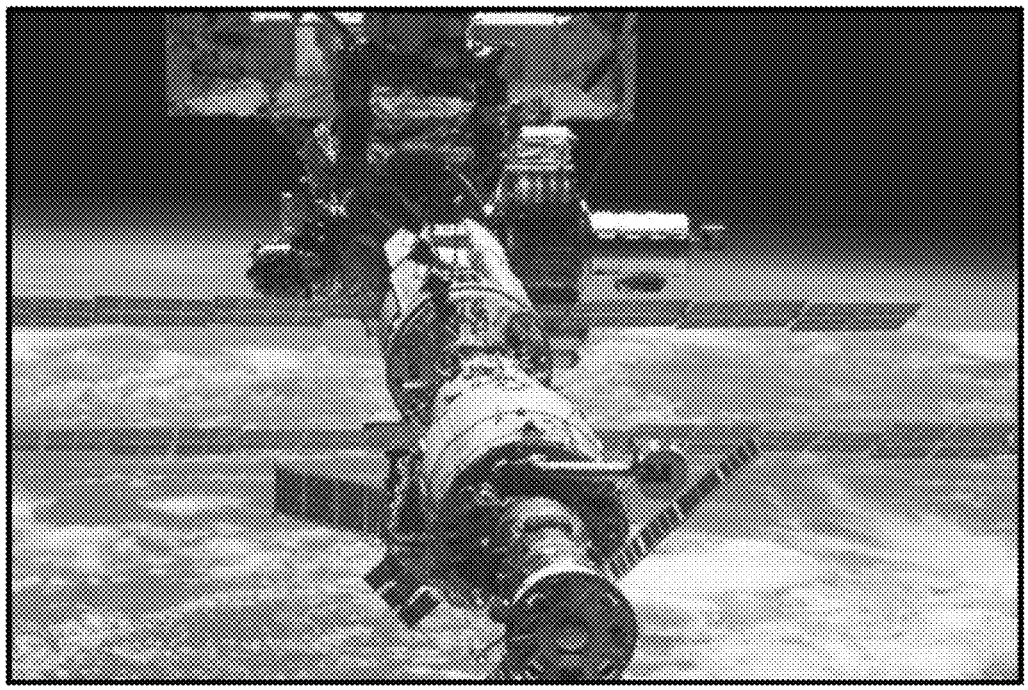
FIG. 5A illustrates the original input image.
Figure 5B:
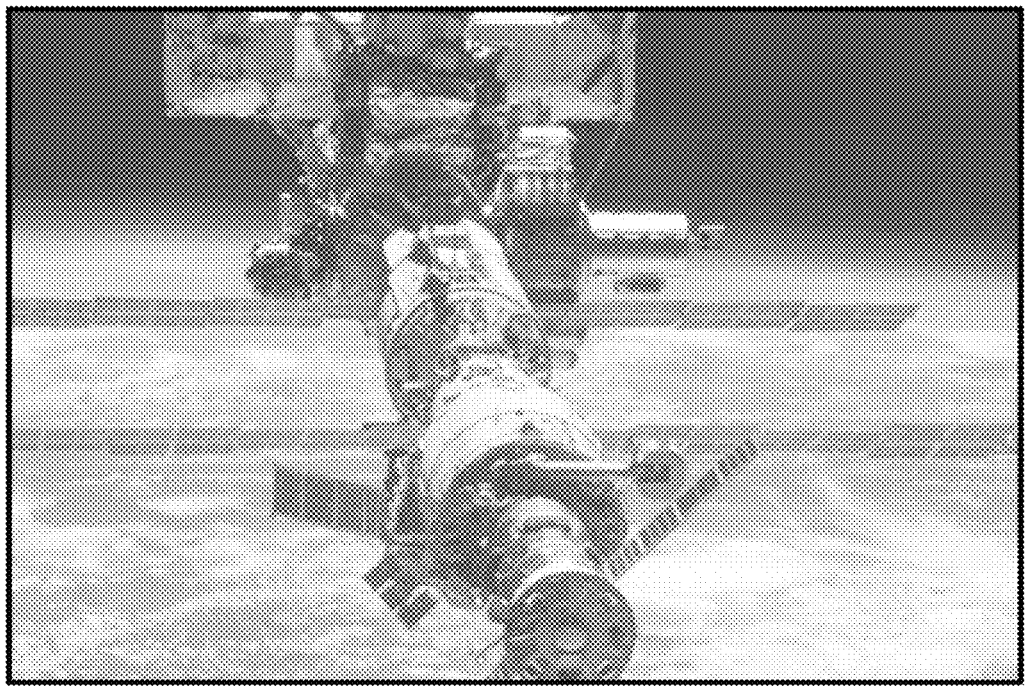
FIG. 5B illustrates a gamma-corrected image for FIG. 5A.
Figure 5C:
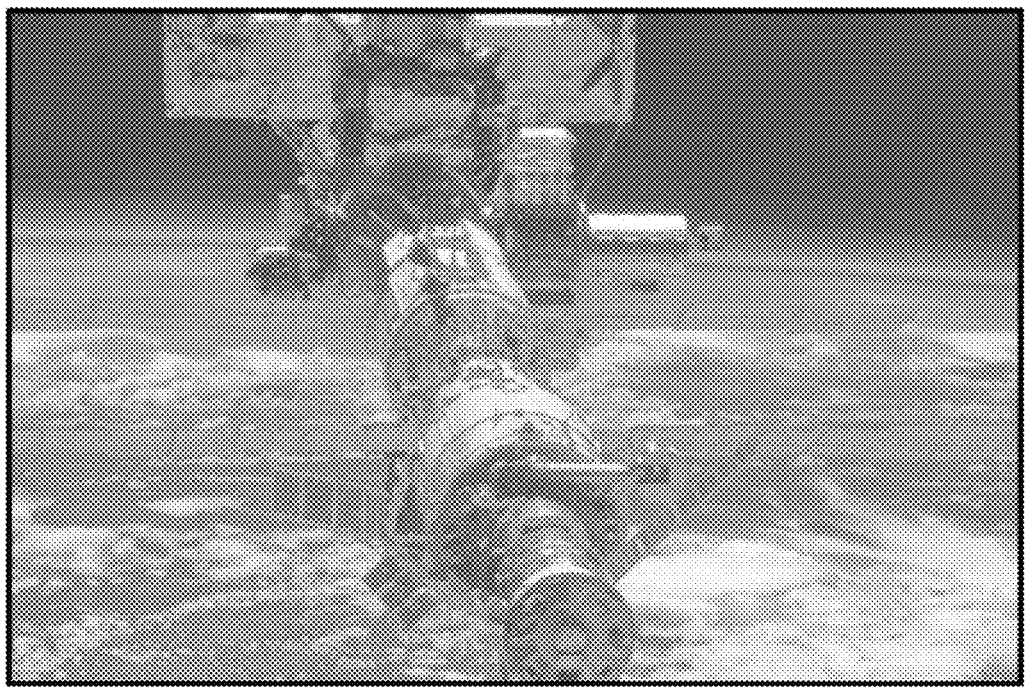
FIG. 5C illustrates a shadow-enhanced version of the image of FIG. 5A in accordance with one embodiment of the present disclosure.

The washed out look from a prior art gamma correction and the shadows enhanced version may be seen in FIGS. 5A-5C. FIG. 5A illustrates the original input image. FIG. 5B illustrates a gamma-corrected image for FIG. 5A. FIG. 5C illustrates a shadow-enhanced version of the image of FIG. 5A in accordance with one embodiment of the present disclosure. Note how the Earth in the gamma-corrected image (FIG. 5B) has been made too bright, but this is not the case for the shadow-enhanced image (FIG. 5C).

Figure 6A:
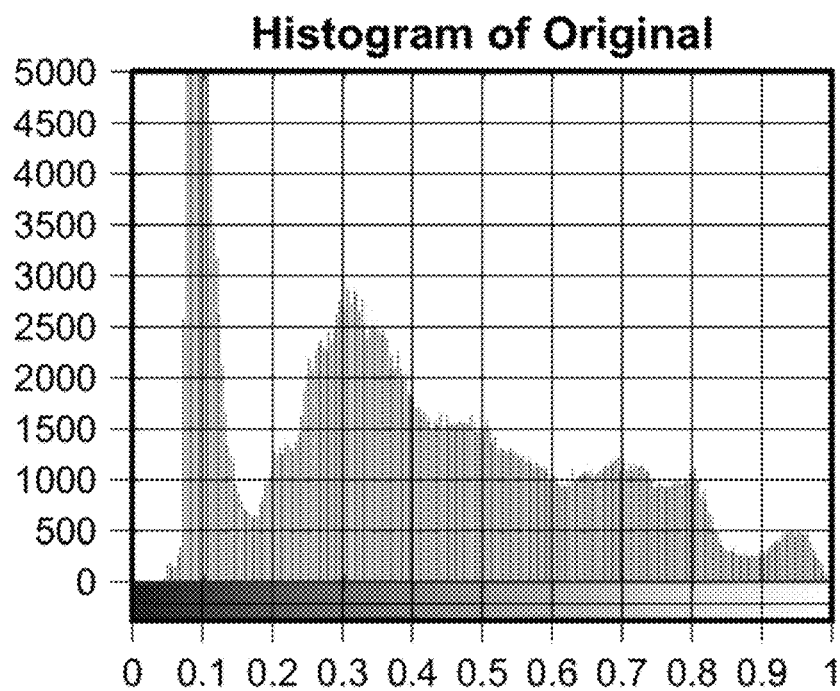
FIG. 6A illustrates histograms of the original input image.
Figure 6B:
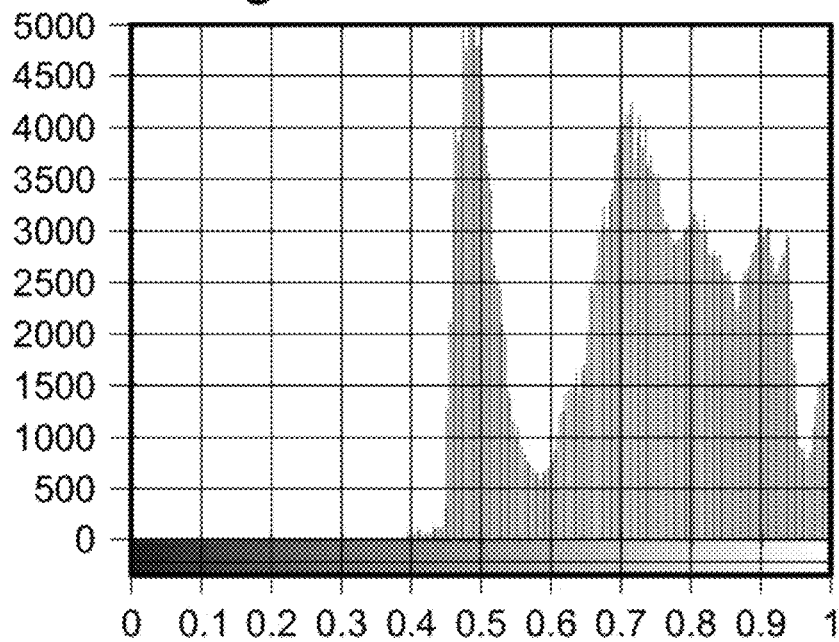
FIG. 6B illustrates a histogram for the gamma-corrected image for FIG. 5A.
Figure 6C:
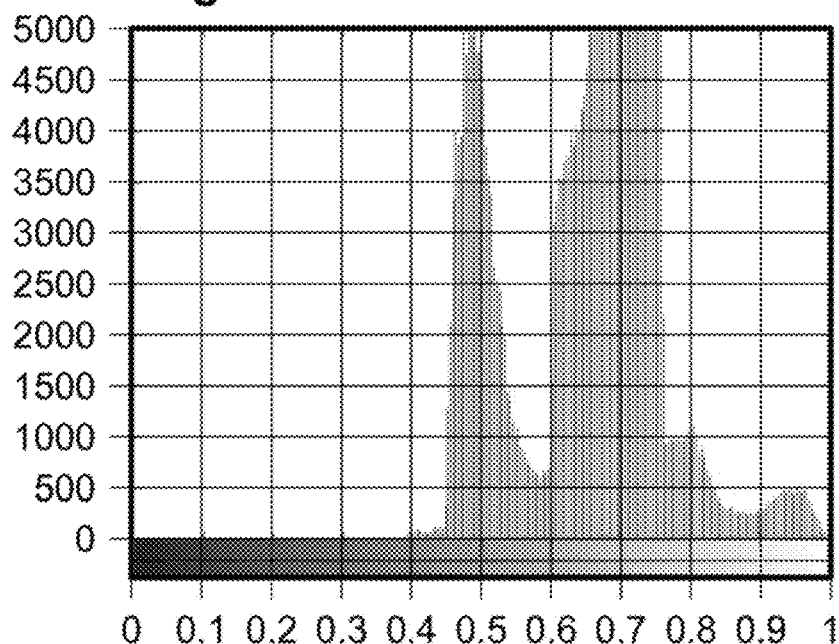
FIG. 6C illustrates a histogram of the shadow-enhanced version of the image of FIG. 5A in accordance with one embodiment of the present disclosure.

Another way to highlight the differences between the standard gamma correction and the new shadow enhancement is to examine the histograms shown in FIGS. 6A-6C. FIG. 6A shows the original histogram, FIG. 6B shows the gamma-corrected histogram and FIG. 6C shows the shadow-enhanced histogram.

FIG. 6A is the original histogram, of the original input image. Clearly, there are many pixels in the lower end of the histogram, which are the shadowed pixels. Using the same value for gamma and L, both the gamma correction and shadow enhancement were applied separately. In FIG. 6B, the histogram of the gamma-corrected image is shown. The large spike from the input histogram has shifted up and the rest of the histogram has been compressed. However, in the histogram from the shadows enhanced image on the right in FIG. 6C, it may be seen that the histogram from about 0.75 to 1 has been left untouched by the enhancement when compared to the original histogram.

Another new feature of this method is the level of fine control over how the shadowed and bright regions are separated. That is, the threshold controls the pixel intensity at which to set the threshold while the scale factor independently determines how sharp that transition is. The level of brightening then affects how bright the shadowed regions will become.

An advantage of the present system and method is the simplicity. It is computationally efficient and though three parameters seem burdensome to adjust, it has been found that the scale factor is nearly always a constant and the other two parameters only need to be varied over a very a small range. In fact, for a wide variety of images, a single set of parameters has been shown to be very effective. The present system and method is much simpler than, say, a genetic algorithm.

Another advantage of the present system and method is that they work across a variety of natural images including images from space (e.g. FIG. 3), images in air, and images underwater. Instead of previous approaches that required a target of constant intensity to be imaged or only worked for certain classes of images (e.g. white objects on a black background or vice versa), this invention does not require any reference images and works for any type of imagery.

One alternative is that the present system and method could be reversed, so to speak, and be used to darken the bright areas of an image while leaving the darker areas untouched. In this case, the level of brightening would take on values greater than one (1) and the pixels below the threshold would be handled differently (instead of those above the threshold for the shadow enhancement).

Another alternative would be that the selection of the threshold and level of brightening could be automated (the value of scale does not seem to vary much) based on histogram metrics or otherwise, instead of having the user select values.

The gamma map may be manipulated to prevent very small regions of dark pixels from being brightened. For example, groups of pixels numbering smaller than ten might be eliminated before the power-law transformation.

Instead of an actual power-law transformation calculated with gamma, a pixel mapping look-up table could be computed to reduce computations and improve speed.

The present system and method can be used for monochrome images or color images by converting the color image to an intensity image prior to processing.

Figure 7:
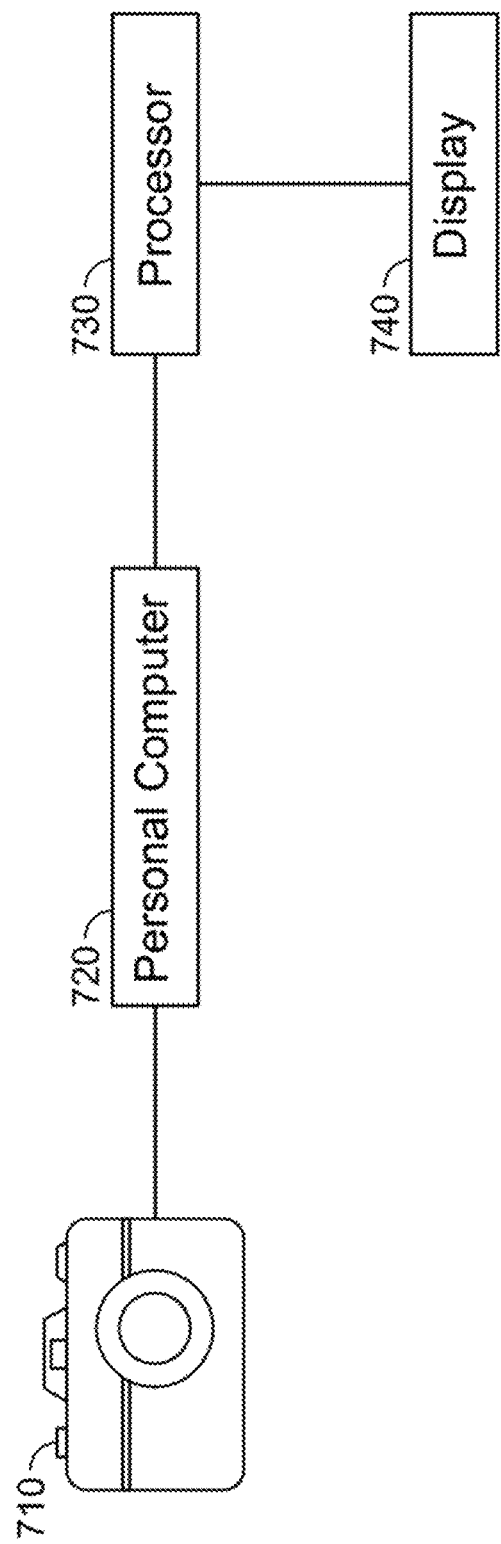
FIG. 7 is an illustration of a system for shadow brightening image enhancement in accordance with one embodiment of the present disclosure.

FIG. 7 is a system for shadow brightening in accordance with one embodiment of the present disclosure. The system 700 may include an imaging system 710, a personal computer 720 that is operably coupled to the imaging system 710, a processor 730 that is operably coupled to the imaging system 710 and a display 740 that is operably coupled to the imaging system 710.

The imaging system 710 could be any digital imaging system. Digital imaging system 710 can connect to personal computer 720. The original input image may be fed from the imaging system 710 to the personal computer 720. The personal computer 720, which may include its own memory and processor, may feed the image to another processor 730 such as a graphics processing unit.

As an alternative to the system illustrated in FIG. 7, the personal computer 720 may be removed and the imaging system 710 and processor 730 can be connected immediately adjacent to each other. Some processing that was done by the personal computer 720 may be off-loaded to the imaging system 710 (which may include a processor) and/or the processor 730 shown in FIG. 7.

Software (not shown in FIG. 7) may be resident in the memory of personal computer 720, which may cause the processor 730 to perform one or more steps of the method for shadow brightening as set forth herein.

A memory resident on imaging system 710 and/or personal computer 720, as noted hereinabove, is sufficient to hold at least the original input image, a brightening level L and a threshold pixel intensity. A memory resident on imaging system 710 and/or personal computer 720, may also include other elements such as copies of the original input image, as well as processing steps or instructions related to shadow enhancement. Examples of such processing steps are described in the flow block diagram of FIG. 1.

The speed of the processor 730 needed may depend on the application in which the processor 730 is used, as can be appreciated by one of ordinary skill in the art.

The foregoing description of various embodiments has been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A shadow brightening method, comprising:
   receiving, at a memory device, an input image having a plurality of pixels including that each pixel of the pixels specifies an input intensity, wherein a respective gamma is associated with each of the pixels;
   determining, via a processor, from the input intensity of each pixel of the pixels that the pixel is one of dark, transitional, and bright, wherein the pixel is dark when the input intensity of the pixel is less than or equal to a specified threshold, otherwise the pixel is transitional when the input intensity of the pixel is less than a crossover threshold, and otherwise the pixel is bright;
   for each pixel of the pixels that is dark, setting, via the processor, the respective gamma of the pixel to a specified brightening level;
   for each pixel of the pixels that is transitional, setting, via the processor, the respective gamma of the pixel to a scaling function of the input intensity of the pixel, wherein, over a range of the input intensity from the specified threshold to the crossover threshold, the scaling function monotonically increases from the specified brightening level at the specified threshold until the scaling function equals one at the crossover threshold;
   for each pixel of the pixels that is bright, setting, via the processor, the respective gamma of the pixel to a value of one, so that the pixel remains unchanged;
   calculating, via the processor, an output intensity of each pixel of the pixels from a gamma transformation of the input intensity of the pixel and the respective gamma of the pixel; and
   outputting, via the processor, a shadow-brightened output image having the pixels including that each pixel of the pixels specifies the output intensity of the pixel.

2. The method of claim 1, wherein the method further comprises inputting the specified brightening level that is less than one and the specified threshold that is greater than zero and less than one from an end user.

3. The method of claim 1, wherein the input image is one of a still image and an image from a video.

4. The method of claim 1, wherein the specified brightening level and the specified threshold are based on histogram metrics.

5. The method of claim 1, before the calculating step, grouping those of the pixels that are dark into smaller groups of a predetermined number and, for each pixel that is in the smaller groups, setting the respective gamma of the pixel to a value of one, so that the pixel remains unchanged.

6. The method of claim 1, wherein the input image is color image, and the method further comprises the step of:
   converting the color image to an intensity image specifying the input intensity for each of the pixels.

7. A shadow brightening system, comprising:
   a memory device configured to receive an input image having a plurality of pixels including that each pixel of the pixels specifies an input intensity, wherein a respective gamma is associated with each of the pixels; and
   a processor configured to:
      determine from the input intensity of each pixel of the pixels that the pixel is one of dark, transitional, and bright, wherein the pixel is dark when the input intensity of the pixel is less than or equal to a specified threshold, otherwise the pixel is transitional when the input intensity of the pixel is less than a crossover threshold, and otherwise the pixel is bright;
      for each pixel of the pixels that is dark, set the respective gamma of the pixel to a specified brightening level;
      for each pixel of the pixels that is transitional, set the respective gamma of the pixel to a scaling function of the input intensity of the pixel, wherein, over a range of the input intensity from the specified threshold to the crossover threshold, the scaling function monotonically increases from the specified brightening level at the specified threshold until the scaling function equals one at the crossover threshold;
      for each pixel of the pixels that is bright, set the respective gamma of the pixel to a value of one, so that the pixel remains unchanged;
      calculate an output intensity of each pixel of the pixels from a gamma transformation of the input intensity of the pixel and the respective gamma of the pixel; and
      output a shadow-brightened output image having the pixels including that each pixel of the pixels specifies the output intensity of the pixel.

8. The system of claim 7, wherein the input image is one of a still image and an image from a video.

9. The system of claim 7, wherein the specified brightening level and the specified threshold are based on histogram metrics.

10. The system of claim 7, wherein the input image is color image, and the processor is further configured to:
    convert the color image to an intensity image specifying the input intensity for each of the pixels.

11. The method of claim 1, wherein, the output intensity from the gamma transformation monotonically decreases over the range of the input intensity from the specified threshold to the crossover threshold, in which range the scaling function, which provides the respective gamma for each pixel that is transitional, monotonically increases.

12. The method of claim 1, further comprising:
capturing the input image via a camera.

13. The method of claim 1, wherein the calculating of the output intensity from the gamma transformation includes, for each pixel of the pixels, setting the output intensity of the pixel to the input intensity of the pixel raised to a power that is the respective gamma of the pixel.

14. The method of claim 13, wherein the setting of the respective gamma to the scaling function for each pixel that is transitional includes setting the respective gamma for the pixel to the scaling function having a formula $y_{x,y} = Le^{S(I_{x,y}-T)}$ where $y_{x,y}$ is the respective gamma associated with the x, y pixel, L is the specified brightening level, S is a scale factor specifying a sharpness at which the scaling function monotonically increases from the specified brightening level at the specified threshold until the scaling function equals one at the crossover threshold, $I_{x,y}$ is the input intensity of the x,y pixel, and T is the specified threshold.

15. The method of claim 14, wherein the crossover threshold is given by a formula $$U = T - \frac{\ln L}{S}$$

where U is the crossover threshold with T<U<1.

16. The method of claim 14, wherein the method further comprises:
inputting the specified brightening level, L, that is less than one from an end user;
inputting the specified threshold, T, that is greater than zero and less than one from the end user; and
inputting the scale factor, S, from the end user.

17. The system of claim 7, wherein, the output intensity from the gamma transformation monotonically decreases over the range of the input intensity from the specified threshold to the crossover threshold, in which range the scaling function, which provides the respective gamma for each pixel that is transitional, monotonically increases.

18. The system of claim 7, further comprising:
a camera for capturing the input image.

19. The system of claim 7, wherein the memory device is further configured to store a look-up table for the gamma transformation, and the processor is further configured to read the output intensity for each pixel of the pixels from the look-up table, which output intensity is the input intensity of the pixel raised to a power that is the respective gamma of the pixel.

20. The system of claim 19, wherein the processor is further configured to set the respective gamma to the scaling function for each pixel that is transitional by setting the respective gamma for the pixel to the scaling function having a formula $y_{x,y} = Le^{S(I_{x,y}-T)}$ where $y_{x,y}$ is the respective gamma associated with the x,y pixel, L is the specified brightening level, S is a scale factor specifying a sharpness at which the scaling function monotonically increases from the specified brightening level at the specified threshold until the scaling function equals one at the crossover threshold, $I_{x,y}$ is the input intensity of the x,y pixel, and T is the specified threshold.

* * * * *